United States Patent [19]

Osborn

[11] Patent Number: 5,080,638
[45] Date of Patent: Jan. 14, 1992

[54] CYCLOIDAL GEARING

[76] Inventor: Merritt A. Osborn, 8706 Cedar Rd., Chesterland, Ohio 44026

[21] Appl. No.: 465,426

[22] Filed: Jan. 16, 1990

[51] Int. Cl.$^5$ .............................................. F16H 1/32
[52] U.S. Cl. ................................. 475/179; 475/162
[58] Field of Search ............... 475/162, 167, 178, 179

[56] References Cited

U.S. PATENT DOCUMENTS

| 474,903 | 5/1892 | Cottrell | 475/178 |
| 1,590,166 | 6/1926 | Howard | 475/178 |
| 2,170,951 | 8/1939 | Perry | 475/178 |
| 3,073,184 | 1/1963 | Braren | 475/162 X |
| 3,190,149 | 6/1965 | Gorfin | 475/167 |
| 3,307,434 | 3/1967 | Kope | 475/167 |
| 4,307,630 | 12/1981 | Osborn et al. | 475/167 X |
| 4,640,154 | 2/1987 | Osborn | 475/167 X |
| 4,770,006 | 9/1988 | Minegishi | 74/804 |
| 4,807,494 | 2/1989 | Lew | 475/167 X |

FOREIGN PATENT DOCUMENTS 1223218  8/1966  Fed. Rep. of Germany ...... 475/178

Primary Examiner—Dwight Diehl
Attorney, Agent, or Firm—Calfee Halter & Griswold

[57] ABSTRACT

A cycloidal gear device is provided in which rotational input motion is transformed through oscillation of a torque plate in linear direction to a smooth, high torque low speed output. In one embodiment, the device also includes a hollow input shaft, and an output shaft telescoped within the input shaft. The input shaft is journalled on the output shaft to thereby utilize the output shaft on a load support member for the input forces.

5 Claims, 4 Drawing Sheets 5,080,638

CYCLOIDAL GEARING

BACKGROUND OF THE INVENTION

This invention relates generally to gearing devices, and more particularly to cycloidal type gears that have improved mounting shaft structures and improved torque transmission mechanisms.

Composite gear structure formed from sprocket and chain units are starting to find application in many types of power transmissions, but they are especially desirable in applications which require high torque low speed output, the output either being through a rotating shaft or a torque arm having some other type of restrained motion. In these types of applications, it is necessary to have a bearing design which will support high torque loads with minimal deflection. Also, in many of these types of applications, it is necessary to impart high torque and the design should allow free smooth movement without unnecessary binding.

SUMMARY OF THE INVENTION

An improved cycloidal speed reduction gear device is provided. The device in one embodiment has improved load carrying capacity by utilizing shaft arrangement wherein the input shaft is telescoped over and supported by the output shaft. The invention also provides a torque transmission plate that smoothly and effectively translates rotating input motion to low speed high torque movement through oscillating gear motion.

DESCRIPTION OF THE DRAWINGS

FIG. 3($b$) is a view similar to FIG. 3($a$) but with the sprocket rotated 90° therefrom;

DESCRIPTION OF THE PREFERRED EMBODIMENTS

Figure 3A:
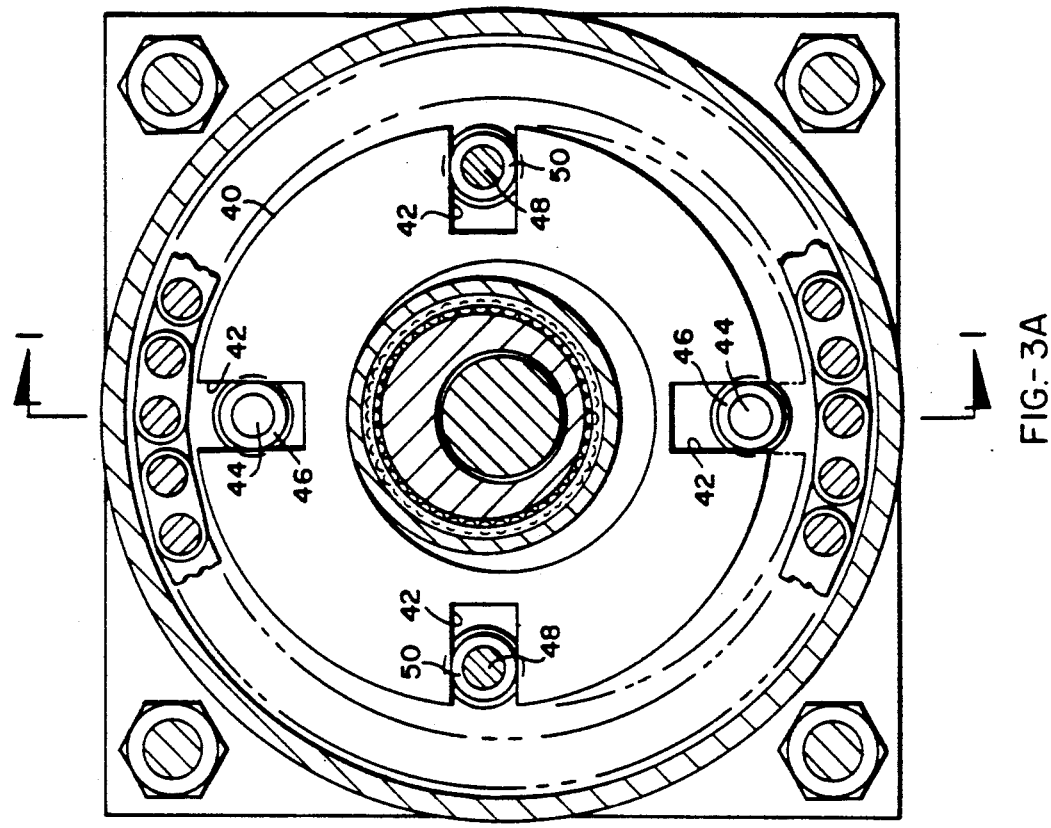
FIG. 3($a$) is a sectional view taken substantially along the plane 3—3 of FIG. 1.
Figure 1:
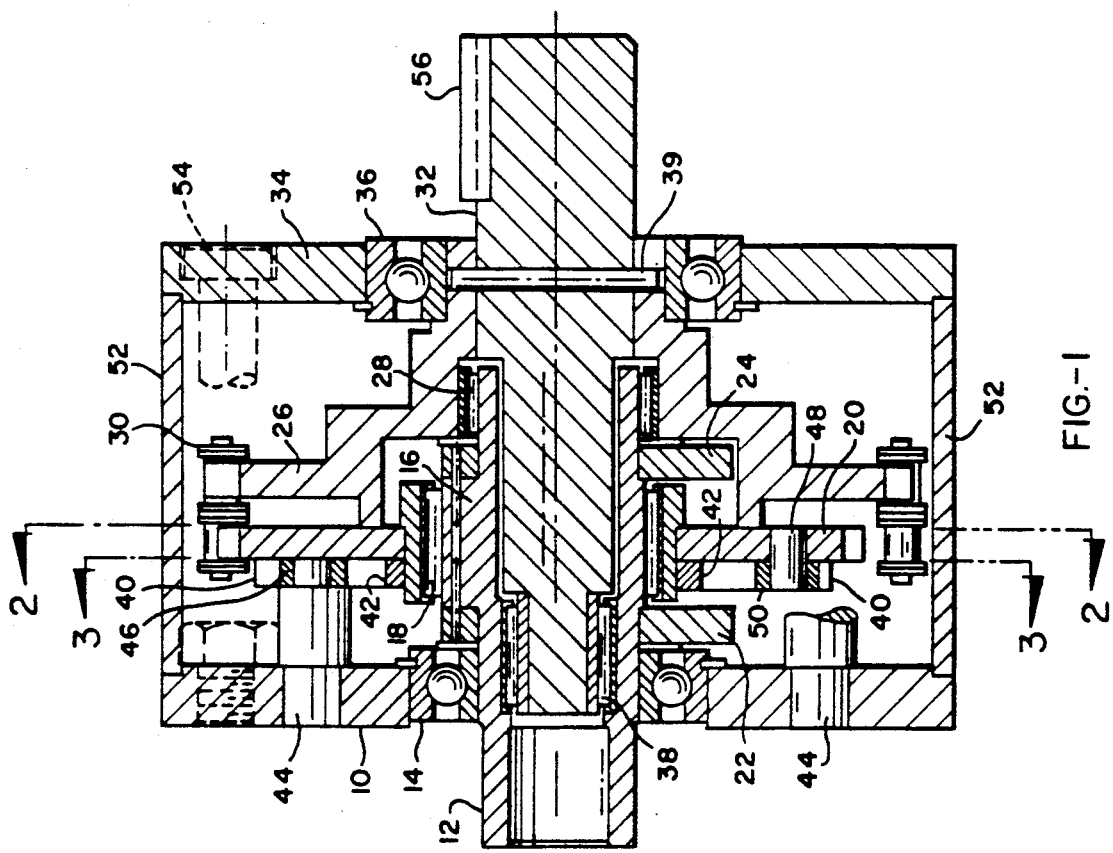
FIG. 1 is a longitudinal sectional view of a cycloidal gear device according to the present invention.

Referring now to the drawings, and for the present to FIGS. 1 through 4, an improved cycloidal speed reduction gearing device according to this invention is shown. The gearing device includes an end plate 10 which in this embodiment serves as a torque arm. A hollow input shaft 12 extends through the end plate 10 and is journalled thereon by ball bearing 14. The input shaft 12 is formed with an eccentric 16 on which roller bearing 18 journals an input gear 20. A pair of counterweights 22 and 24 are secured to the input shaft 12 and disposed on the opposite side of the high dwell of the eccentric 16. An output gear 26 is also provided which is journalled by roller bearing 28 on the input shaft 12. The tooth differential between gears 20 and 26 may be 1, 2, or 3 teeth depending upon the reduction desired. A dual strand roller chain 30 is reeved around the gears 20 and 26. An output shaft 32 is journalled in a second end plate 34 by a single ball bearing 36 and is telescopingly received within the hollow input shaft 12 and is journalled therein by roller bearing 38. Roller bearing 38 and ball bearing 14 are located in the same plane perpendicular to the longitudinal axis of input shaft 12. The output shaft 32 is connected to the output gear 26 by pin 39.

A torque plate 40 is interposed between the end plate 10 and the input gear 20. The torque plate 40 is provided with four circumferentially spaced slots 42 (see FIGS. 2, 3, and 4), the torque plate 40 being mounted by means of these slots 42 as follows. A pair of pins 44 are connected to the end plate 10 and spaced 180° from each other. Each of the pins 44 are provided with bushings 46 which ride in one pair of the slots 42. The input gear 20 is also provided with a pair of pins 48 which also are spaced 180° from each other, and 90° with respect to the pins 44. The pins 48 are also provided with bushings 50 which ride in the other two slots 42.

This device is also provided with side plates 52 which are secured to the end plates 10 and 34 by means of threaded bolts 54. A key 56 is also provided on the output shaft 32 to allow for attachment to a driven device.

The device operates as follows to translate high speed low torque input from the shaft 20 to low speed high torque output to the shaft 32.

Rotation of the shaft 12 through the eccentric 16 will impart a motion to the input gear 20, urging the gear 20 outwardly at the location of the high throw of the eccentric 16. However, the gear 20 is connected through pins 48 and bushings 50 to the torque plate 40, and similarly the torque plate 40 is connected through pins 44 and bushings 46 to the end plate 10. Because of this connection of the torque plate 40 to the end plate 10, the torque plate is restrained from rotational movement, but it is free to move up and down in an oscillating motion guided by the pins 44 and bushings 46. Since the torque plate 40 is restrained from rotational movement, and since the input gear 20 is connected to the torque plate 40 by pins 48 and bushings 50, the input gear 20 is also restrained from rotational movement. However, the gear 20 is free to move from side to side in an oscillating motion with the bushings 50 being guided in slots 42. Hence, the vertical component of the movement of the gear 20 under the action of the eccentric is translated into vertical movement of the torque plate 40 guided by bushings 46 riding in slots 42, and the horizontal component of the movement of the gear 20 is translated into horizontal movement of the gear 20 guided by the bushings 50 riding in slots 42. Hence this motion is transferred to the chain 30, which drives output gear 26, which in turn drives the output shaft 32.

Figure 3B:
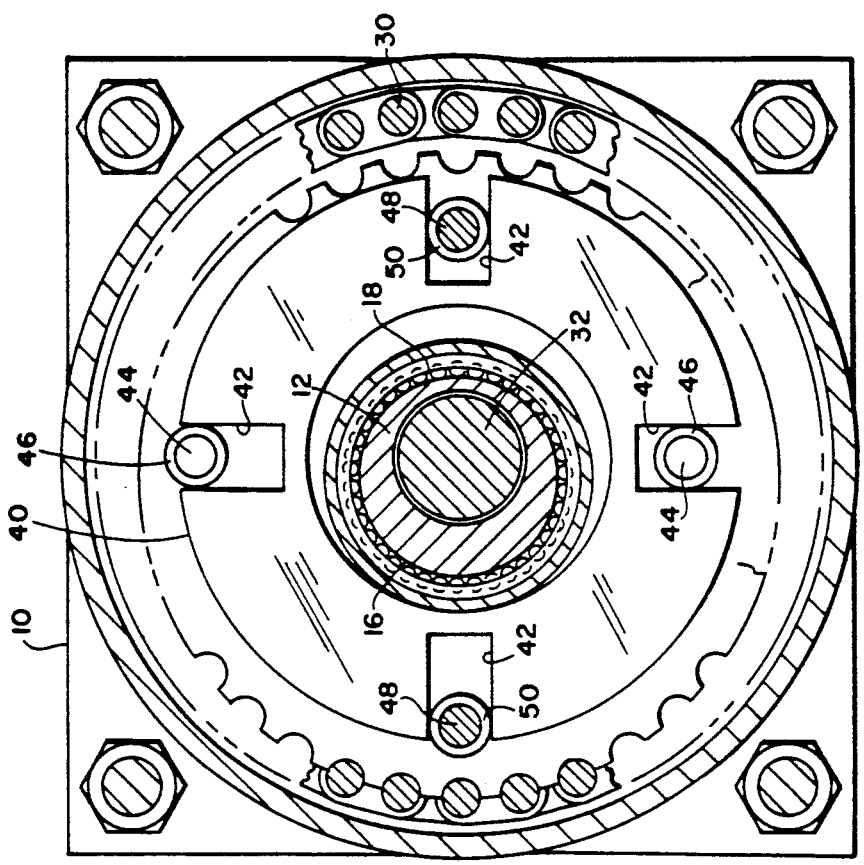
Figure 2:
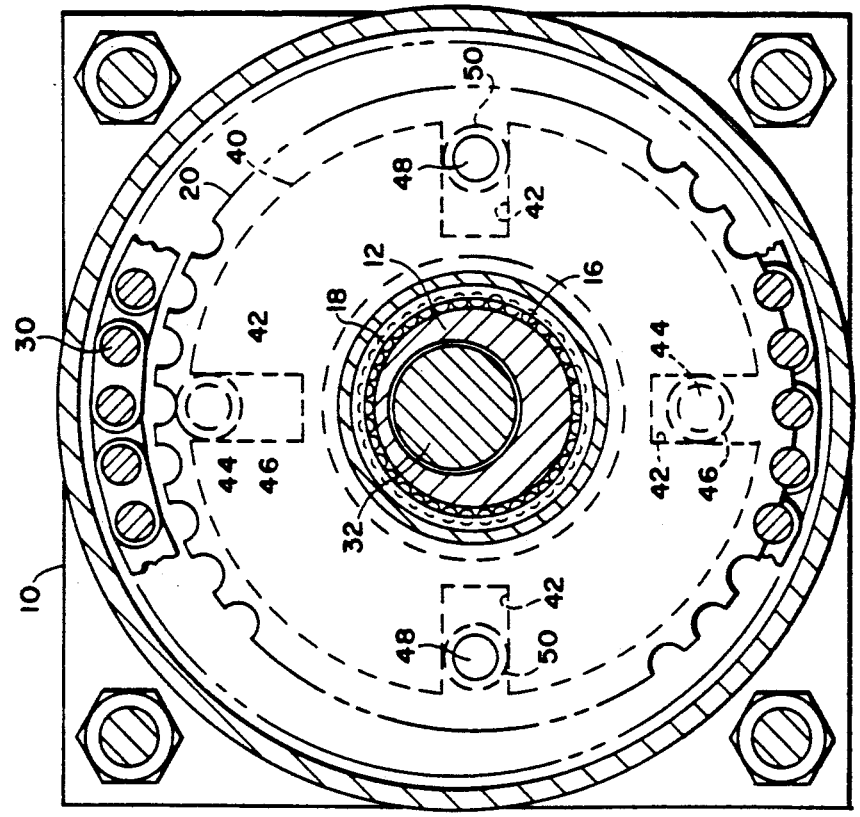
FIG. 2 is a sectional view taken substantially along the plane 2—2 of FIG. 1.
Figure 4:
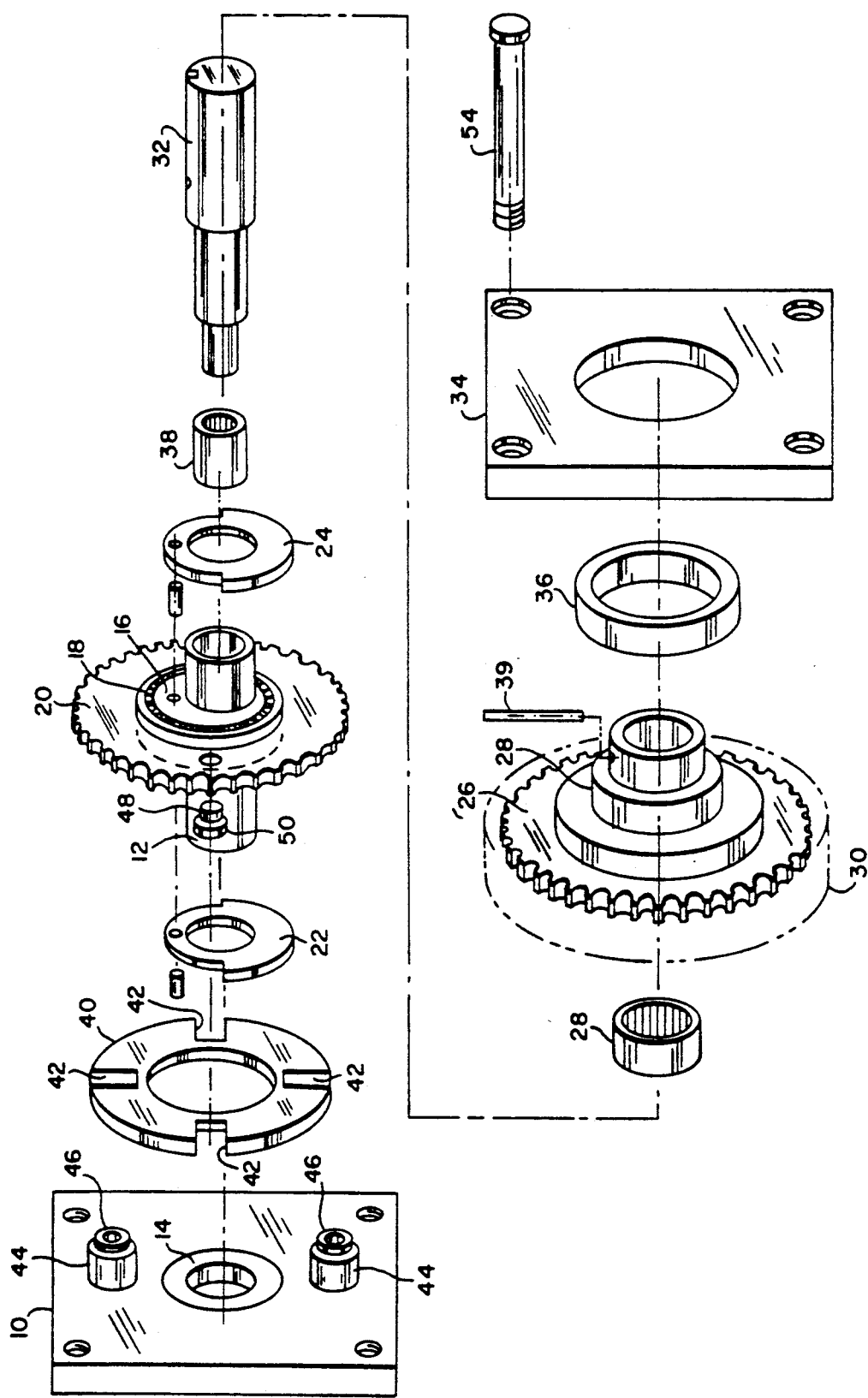
FIG. 4 is an exploded perspective view of the device of FIG. 1.
Figure 6:
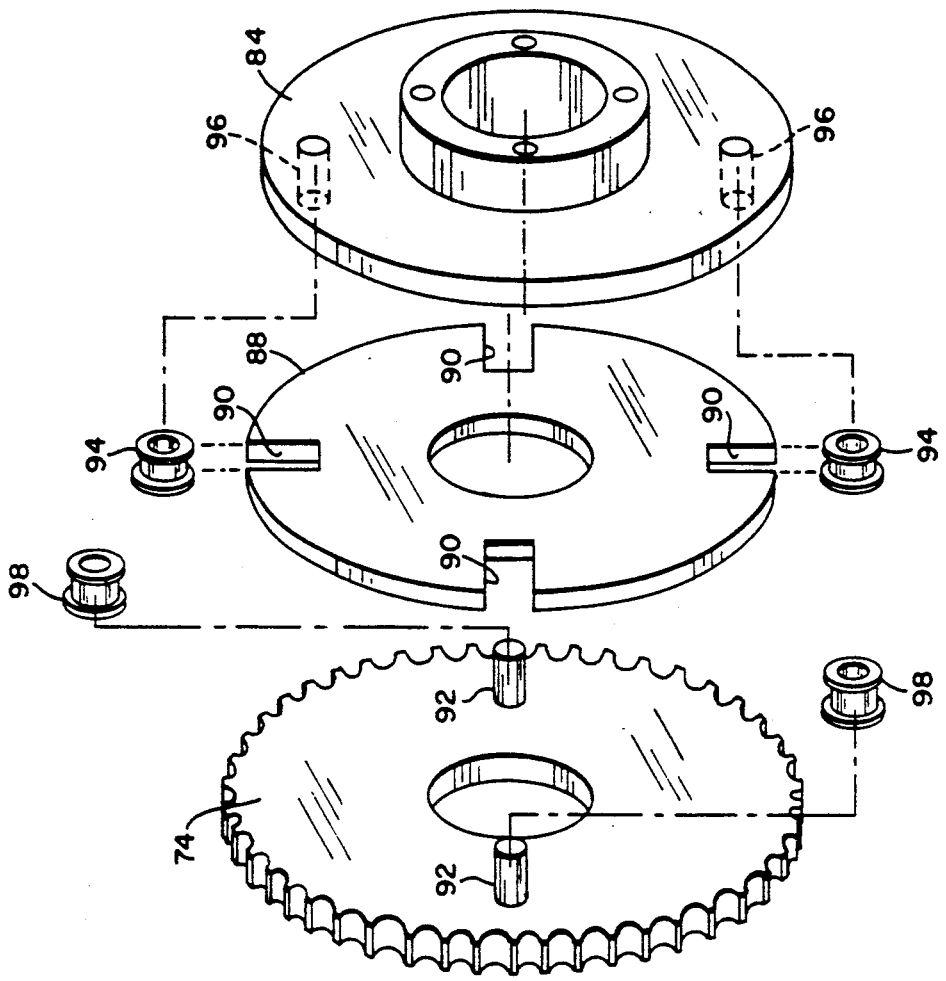
FIG. 6 is an exploded perspective view of the drive interconnection between the input shaft and output shaft of the device.

One of the advantages of this drive is the very smooth transition of the motion of the input gear 20 from movement in one lateral direction to the other. The speed curve of the gear is such that when the output gear 20 is at one lateral extreme or the other (as shown in FIG. 2) it is essentially at rest. As the drive starts to move it toward the opposite extreme, its start up speed is slow, gradually increasing to a maximum at the halfway point (as shown in FIG. 3$b$) and then decreases, slowing down as it reaches the opposite lateral extreme until it reaches a rest point, at which time and only at which time movement in the opposite direction starts, again gradually increasing in speed until the halfway point and then decreasing to zero to the extreme lateral position of the gear 20. The torque plate 40 follows a similar motion in the vertical direction and through pins and linings 48 and 50 imparts this motion to the gear 20 in the vertical component of its movement.

Another advantage of this invention in this embodiment is the telescoping relationship of the output shaft 32 within the input shaft 12. This allows the output shaft itself to act as a bearing member to support the high speed rotating input shaft 12. This will carry high torque and bending loads minimizing deflection of both shafts by using the output shaft as a bearing member for the input shaft.

While the device is shown with input shaft 12 mounted as a part of the gear device by bearing 14, it is contemplated that the input shaft 12 could be an extension of the shaft of a motor, which shaft is journalled in the motor, and supported only by bearing 38, or a similar bearing on the output shaft 32. In such a case the positioning of the bearing 38 could be in radial alignment with bearing 18.

Figure 5:
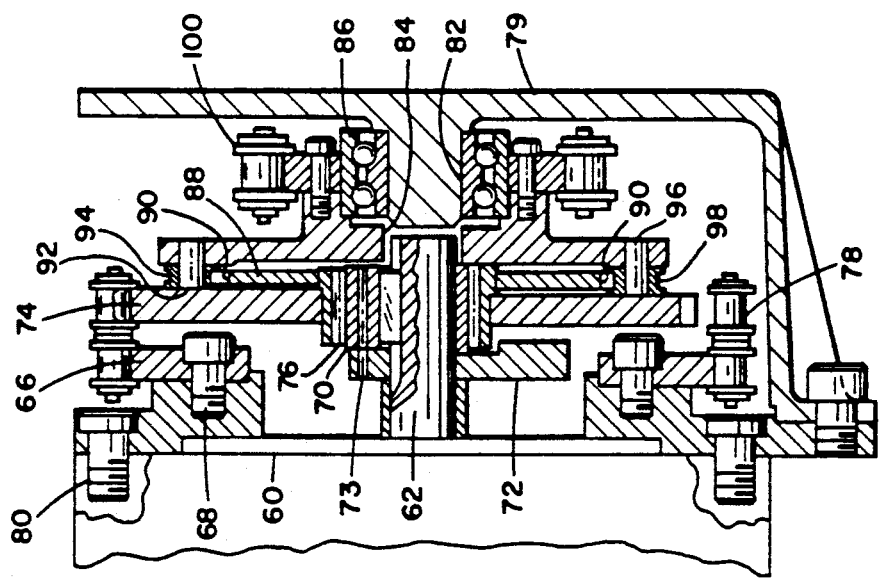
FIG. 5 is a longitudinal sectional view of another embodiment of a cycloidal gear device according to this invention.

Referring now to FIG. 5, another embodiment of a cycloidal gear device according to this invention is shown. This embodiment is similar to the previous embodiment but the torque plate is utilized at the output portion of the device rather than the input which changes some of the internal motion but produces a similar output motion.

The device of FIG. 5 has an end plate 60 which journals an input shaft 62 on ball bearing 64. A stationary ring gear 66 is secured to the end plate 60 by threaded bolts 68. The input shaft 62 has formed thereon an eccentric 70 which mounts a counterweight 72 secured thereto by pin 73. An input gear 74 is mounted on input shaft 62 on roller bearing 76. A dual strand roller chain 78 is reeved around the gears 66 and 74. A second end plate 79 is provided, which is secured to the first end plate 60 by threaded bolts 80. The end plate 79 is provided with a projection 82, and a hollow output shaft 84 is journalled on the projection 82 by ball bearings 86. A torque plate 88 is interposed between the output shaft 84 and the input gear 74. The torque plate is similar to that described in the previous embodiment, having four slots 90. The input gear 74 is provided with a pair of pins 92 spaced 180° each having a bushing 94 thereon which bushings ride in the slots 90. Similarly the output shaft 84 has a pair of pins 96 spaced 180° each having a bushing 98 thereon which bushings ride in slots 90 spaced 90° from the pins 92. An output chain 100 is connected to the output shaft 84 to drive any driven load.

In operation, rotation of the input shaft 62 acting through the eccentric 70 imparts a motion to the input gear 74. However, in this invention, the torque plate 88 acts as the drive interconnection between the input shaft 62 and output shaft 84 in the following way.

The torque plate 88 is not free to rotate independently of the output shaft, and thus with respect to the output shaft oscillates in a linear direction as guided by pins 96 and bushings 98 on the output shaft. Similarly the torque plate 88 is not free to rotate independently of input gear 74, but is constrained by pins 92 and bearings 94 to oscillating linear motion with respect to the input gear 74. However, since the output shaft 84 is free to rotate on bearings 86, the composite linear oscillating motions of the torque plate with respect to both the input gear 74 and output shaft 84 result in a rotation characterized by high torque low speed output rotation of the output shaft, which is exactly matched in speed by the input gear 74.

While several embodiments of this invention hav been shown and described, various adaptations and modifications can be made without departing from the scope of the appended claims.

What is claimed is:

1. In a cycloid speed reduction gear device, wherein rotating input motion is translated in an increased torque input, the improvement which comprises, a hollow input shaft having a longitudinal axis, an output shaft supporting said input shaft and telescopingly received within said input shaft, a single bearing for journalling said output shaft to a housing of said device for rotational movement, a second bearing for journalling said input shaft to said housing, third bearing means interposed between said input shaft and said output shaft journalling said input shaft for rotation on said output shaft, said third bearing means being substantially coplanar with the plane perpendicular to said longitudinal axis and containing said second bearing, an input gear journalled to said input shaft by means of a fourth bearing, and an output gear journalled to said input shaft by means of a fifth bearing, whereby said output shaft is a load bearing member for input loads.

2. In a planetary gear device, wherein relative input motion is translated to an increased torque output, the improvement comprising, a frame member at least partially enclosing said gear device, said frame member having a projection projecting inwardly therefrom, which projection has an output cylindrical surface, said gear device including an output member, and bearing means journalling said output member for rotational movement on the cylindrical surface of said projection.

3. The device of claim 2 wherein said planetary gear includes roller chain means drivingly engaging gear means.

4. In a cycloidal gear device, wherein rotating input motion is translated in an increased torque input, the improvement which comprises a hollow input shaft, an output shaft telescopingly received within said input shaft, first bearing means journalling said output shaft for rotational movement, and second bearing means interposed between said input shaft and said output shaft journalling said input shaft for rotation on said output shaft, whereby said output shaft is a load bearing member for input loads, and wherein roller bearing means are supported on the outer surface of said input shaft, first gear means eccentrically mounted on said roller bearing means, second gear means operably connected to said output shaft, and chain means drivingly interconnecting said first and second gear means.

5. The device as defined in claim 4 further characterized by third bearing means journalling said second gear means on said input shaft.

* * * * *